United States Patent
Gao et al.

(10) Patent No.: US 9,781,350 B2
(45) Date of Patent: Oct. 3, 2017

(54) SYSTEMS AND METHODS FOR PERFORMING AUTOMATIC ZOOM

(71) Applicant: QUALCOMM Incorporated, San Diego, CA (US)

(72) Inventors: Jinglun Gao, San Diego, CA (US); Dashan Gao, San Diego, CA (US); Xin Zhong, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 14/991,698

(22) Filed: Jan. 8, 2016

(65) Prior Publication Data
US 2017/0094184 A1   Mar. 30, 2017

Related U.S. Application Data

(60) Provisional application No. 62/233,594, filed on Sep. 28, 2015.

(51) Int. Cl.
| | |
|---|---|
| G06K 9/00 | (2006.01) |
| H04N 5/232 | (2006.01) |
| G06T 7/00 | (2017.01) |
| G06T 7/20 | (2017.01) |

(52) U.S. Cl.
CPC ....... *H04N 5/23296* (2013.01); *G06T 7/0044* (2013.01); *G06T 7/20* (2013.01); *H04N 5/23222* (2013.01)

(58) Field of Classification Search
CPC ...... H04N 5/23296; G06T 7/20; G06T 7/0044
USPC .......................................................... 382/103
See application file for complete search history.

(56) References Cited

U.S. PATENT DOCUMENTS

| | | | |
|---|---|---|---|
| 5,434,621 A | 7/1995 | Yu | |
| 5,835,641 A | 11/1998 | Sotoda et al. | |
| 2001/0046309 A1* | 11/2001 | Kamei | G06T 7/254 |
| | | | 382/103 |

(Continued)

FOREIGN PATENT DOCUMENTS

| | | |
|---|---|---|
| EP | 1283499 A1 | 2/2003 |
| EP | 2117225 A1 | 11/2009 |
| JP | 2011039112 A | 2/2011 |

OTHER PUBLICATIONS

International Search Report and Written Opinion—PCT/US2016/045838—ISA/EPO—dated Oct. 25, 2016.

*Primary Examiner* — Gregory F Cunningham

(57) ABSTRACT

An electronic device is described. The electronic device includes a processor. The processor is configured to obtain a plurality of images. The processor is also configured to obtain global motion information indicating global motion between at least two of the plurality of images. The processor is further configured to obtain object tracking information indicating motion of a tracked object between the at least two of the plurality of images. The processor is additionally configured to perform automatic zoom based on the global motion information and the object tracking information. Performing automatic zoom produces a zoom region including the tracked object. The processor is configured to determine a motion response speed for the zoom region based on a location of the tracked object within the zoom region.

30 Claims, 10 Drawing Sheets

(56) References Cited

U.S. PATENT DOCUMENTS

2006/0000911 A1\* 1/2006 Stekel ................ G06K 7/10722
　　　　　　　　　　　　　　　　　　　　　235/462.32
2009/0028386 A1　1/2009　Michimoto et al.
2009/0128618 A1　5/2009　Fahn et al.

\* cited by examiner

SYSTEMS AND METHODS FOR PERFORMING AUTOMATIC ZOOM

RELATED APPLICATION

This application is related to and claims priority to U.S. Provisional Patent Application Ser. No. 62/233,594, filed Sep. 28, 2015, for "SYSTEMS AND METHODS FOR PERFORMING AUTOMATIC ZOOM."

FIELD OF DISCLOSURE

The present disclosure relates generally to electronic devices. More specifically, the present disclosure relates to systems and methods for performing automatic zoom.

BACKGROUND

Some electronic devices (e.g., cameras, video camcorders, digital cameras, cellular phones, smart phones, computers, televisions, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, drones, smart applications, healthcare equipment, set-top boxes, etc.) capture and/or utilize images. For example, a smartphone may capture and/or process still and/or video images. The images may be processed, displayed, stored, and/or transmitted. The images may portray a scene including a landscape and/or objects, for example.

In some cases, it may be difficult to provide automatic functionality. For example, it may be difficult to provide automatic image capture and/or adjustment. As can be observed from this discussion, systems and methods that improve image capture may be beneficial.

SUMMARY

An electronic device is described. The electronic device includes a processor. The processor is configured to obtain a plurality of images. The processor is also configured to obtain global motion information indicating global motion between at least two of the plurality of images. The processor is further configured to obtain object tracking information indicating motion of a tracked object between the at least two of the plurality of images. The processor is additionally configured to perform automatic zoom based on the global motion information and the object tracking information. Performing automatic zoom produces a zoom region including the tracked object. The processor is configured to determine a motion response speed for the zoom region based on a location of the tracked object within the zoom region. The processor may be configured to determine the motion response speed for the zoom region based on at least two zones in the zoom region.

The processor may be configured to perform object tracking based on a full field of view of a camera input. The processor may be configured to determine zoom region motion based on the global motion information and a distance between a tracked object and an anchor point of the zoom region. The processor may be configured to compensate for global motion in a case that the zoom region enters a border buffer zone and a tracked object is moving toward an image boundary.

The processor may be configured to increase zoom in a case that a size ratio of a tracking region and the zoom region is less than a minimum zoom threshold. The processor may be configured to decrease zoom in a case that the size ratio is greater than a maximum zoom threshold. There may be a range between the minimum zoom threshold and the maximum zoom threshold.

The processor may be configured to perform the automatic zoom based on a history table. The processor may be configured to adjust a zoom level from frame-to-frame based on object motion.

A method is also described. The method includes obtaining a plurality of images. The method also includes obtaining global motion information indicating global motion between at least two of the plurality of images. The method further includes obtaining object tracking information indicating motion of a tracked object between the at least two of the plurality of images. The method additionally includes performing automatic zoom based on the global motion information and the object tracking information. Performing automatic zoom produces a zoom region including the tracked object. Performing automatic zoom includes determining a motion response speed for the zoom region based on the location of a tracked object within the zoom region.

A computer-program product is also described. The computer-program product includes a non-transitory tangible computer-readable medium with instructions. The instructions include code for causing an electronic device to obtain a plurality of images. The instructions also include code for causing the electronic device to obtain global motion information indicating global motion between at least two of the plurality of images. The instructions further include code for causing the electronic device to obtain object tracking information indicating motion of a tracked object between the at least two of the plurality of images. The instructions additionally include code for causing the electronic device to perform automatic zoom based on the global motion information and the object tracking information. Performing automatic zoom produces a zoom region including the tracked object. The code for causing the electronic device to perform automatic zoom comprises code for causing the electronic device to determine a motion response speed for the zoom region based on a location of the tracked object within the zoom region.

An apparatus is also described. The apparatus includes means for obtaining a plurality of images. The apparatus also includes means for obtaining global motion information indicating global motion between at least two of the plurality of images. The apparatus further includes means for obtaining object tracking information indicating motion of a tracked object between the at least two of the plurality of images. The apparatus additionally includes means for performing automatic zoom based on the global motion information and the object tracking information. Performing automatic zoom produces a zoom region including the tracked object. The means for performing automatic zoom includes means for determining a motion response speed for the zoom region based on a location of the tracked object within the zoom region.

DETAILED DESCRIPTION

Figure 1:
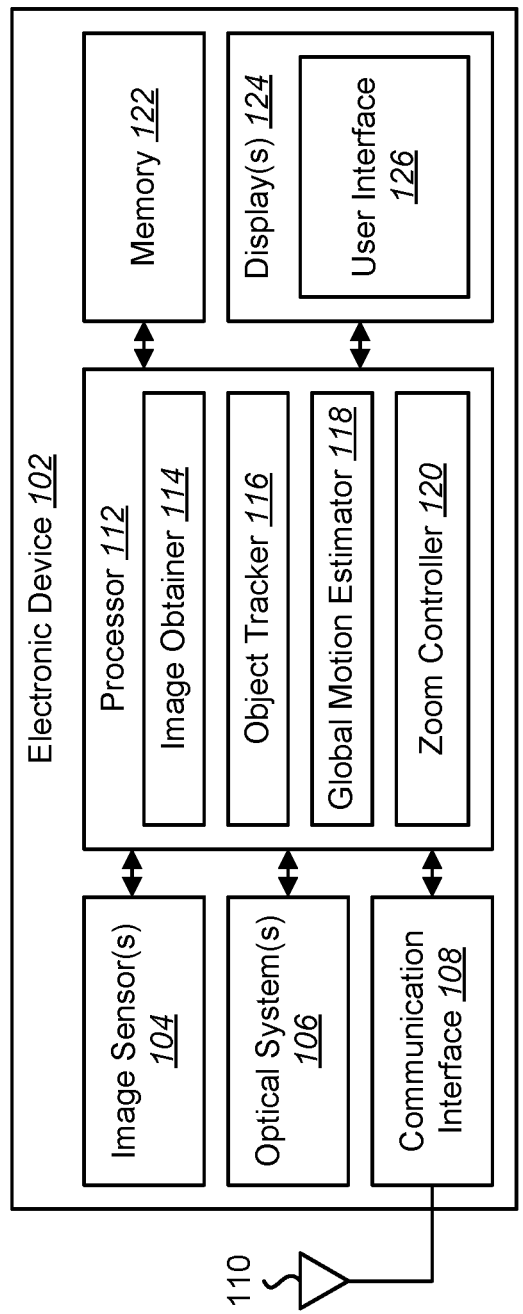
FIG. 1 is a block diagram illustrating one example of an electronic device in which systems and methods for performing automatic zoom may be implemented.

The systems and methods disclosed herein relate to performing automatic zoom. The zooming effect is a feature in a variety of applications. For example, zooming may enlarge a region of interest in an image so that users can either view the enlarged scene on a display and/or record an enlarged scene in a video clip. Some approaches for zooming include a "pinch and zoom" approach, which may only allow a user to see an enlarged region located in the center of the field of view. If the region of interest is not located in the center, the zooming level may be affected (e.g., limited). Moreover, the "pinch and zoom" approach may require substantial user input and/or may not offer good performance when an object of interest is in motion and/or is not located in the center of the field of view.

Some approaches to zoom are given as follows. Pinch and zoom may be an approach to zoom that may be implemented in smartphone camera applications. In this approach, the zooming effect may enlarge the center area of the frame. Accordingly, when the object of interest is not located in the center, the zooming effect may not reach the best zooming level and/or may eliminate the object of interest in the scene. Moreover, substantial user input may be required to zoom in and out for photo and/or video capture. The field of view of the camera view may be the same as the zooming region. Thus, it may be difficult for a user to capture a moving object of interest by zooming in and out to find the object of interest.

Picture in Picture (PiP) is another approach to zoom. Some devices may include the PiP camera feature, where a sub-picture (e.g., a small rectangle or window in the larger picture) shows a zoom-in effect of a selected area. In this approach, the zoomed area may not be restricted to the center of the frame and may zoom in areas that may include nearly the whole field of view. In the PiP approach, the zoomed object may typically appear in the center of the PiP. Shake and jitter due to the camera movement and/or tracking may be enlarged and cause a degraded visual effect.

Automatic video zooming for broadcasting team sport video (e.g., soccer games) on smart phones is another approach. In this approach, zooming may be based on a detected object (e.g., a tracked soccer ball). The zooming ratio may be based on the object movement. However, the object may easily escape the zoomed view in this approach.

Another approach involves tracking and zooming using a wireless sensor. In this approach, only the location but not size information may be acquired. Moreover, zoom may be only center-based (due to the camera limitations). This approach may control a motorized professional camera to pan and zoom based on the wireless sensor.

As can be observed from the foregoing discussion, it may be beneficial to provide an approach to zooming that provides a suitable zooming level according to the size of the object of interest and/or that utilizes less (e.g., minimal) user input, even when the object is in motion and/or is not located in the center of the field of view. An approach that offers these benefits may provide an improved user experience.

The systems and methods disclosed herein may relate to tracking-based automatic zoom. For example, tracking-based automatic zoom may provide an automatic mechanism that provides a stabilized zoomed view according to the location and/or size of a tracked object with reduced user input (e.g., one touch). The systems and methods disclosed herein may achieve a good user experience and may be capable of taking high quality images and/or video clips. Additionally, the stabilized zoomed view that may be provided in accordance with the systems and methods disclosed herein may be beneficial by reducing shakes and jitters. This may be advantageous, as human eyes may be sensitive to shakes and jitters.

In some configurations, the zooming effect may be automatically changed based on the movement, location, and/or the size of a tracked object. The whole field of view may be considered in determining a zoom region. For example, the systems and methods disclosed herein may utilize a whole field of view of the image sensor in determining the zoom region. In other words, zoom region control may be based on an entire image sensor field of view and may not be limited to the view within the zoom region itself. In some configurations, the tracker may obtain a one-touch input to select the object of interest, and may then automatically follow the object of interest during preview and/or video capture. The tracker may still run on the original camera field of view. For example, the tracker may continue to run on the original field of view and not just the cropped zoom region. Thus, the object(s) of interest can move in the wide angle field of view (which is the same as the field of view of the camera sensor, for example) while the zoom region may be viewed and/or captured on the device, which may provide an enlarged and more focused field of view.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for performing automatic zoom may be implemented. For instance, the electronic device 102 may be configured to automatically zoom in and/or zoom out in one or more images and/or video. Examples of the electronic device 102 include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, appliances, etc. The electronic device 102 may include one or more components or elements. One or more of the components or elements may be implemented in hardware (e.g., circuitry) or a combination of hardware and software (e.g., a processor with instructions).

In some configurations, the electronic device 102 may include a processor 112, a memory 122, a display 124, one or more image sensors 104, one or more optical systems 106, and/or a communication interface 108. The processor 112 may be coupled to (e.g., in electronic communication with) the memory 122, display 124, image sensor(s) 104, optical system(s) 106, and/or communication interface 108. The processor 112 may be a general-purpose single- or multi-chip microprocessor (e.g., an ARM), a special-purpose microprocessor (e.g., a digital signal processor (DSP)), a microcontroller, a programmable gate array, etc. The processor 112 may be referred to as a central processing unit (CPU). Although just a single processor 112 is shown in the electronic device 102, in an alternative configuration, a combination of processors (e.g., an ISP and an application processor, an ARM and a DSP, etc.) could be used. The processor 112 may be configured to implement one or more of the methods disclosed herein.

In some configurations, the electronic device 102 may perform one or more of the functions, procedures, methods, steps, etc., described in connection with one or more of FIGS. 2-10. Additionally or alternatively, the electronic device 102 may include one or more of the structures described in connection with one or more of FIGS. 2-10.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface). In some configurations, the communication interface 108 may send information (e.g., image information, surround view information, etc.) to and/or receive information from another device (e.g., a vehicle, a smart phone, a camera, a display, a remote server, etc.).

The electronic device 102 may obtain one or more images (e.g., digital images, image frames, frames, video, etc.). For example, the electronic device 102 may include the image sensor(s) 104 and the optical system(s) 106 (e.g., lenses) that focus images of scene(s) and/or object(s) that are located within the field of view of the optical system 106 onto the image sensor 104. A camera (e.g., a visual spectrum camera or otherwise) may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, etc.). The optical system(s) 106 may be coupled to and/or controlled by the processor 112. Additionally or alternatively, the electronic device 102 may request and/or receive the one or more images from another device (e.g., one or more external cameras coupled to the electronic device 102, a network server, traffic camera(s), drop camera (s), vehicle camera(s), web camera(s), etc.). In some configurations, the electronic device 102 may request and/or receive the one or more images via the communication interface 108. For example, the electronic device 102 may or may not include camera(s) (e.g., image sensor(s) 104 and/or optical system(s) 106) and may receive images from one or more remote device(s). One or more of the images (e.g., image frames) may include one or more scene(s) and/or one or more object(s).

In some configurations, the electronic device 102 may include an image data buffer (not shown). The image data buffer may buffer (e.g., store) image data from the image sensor(s) 104 and/or external camera(s). The buffered image data may be provided to the processor 112.

In some configurations, the electronic device 102 may include a camera software application and/or one or more displays 124. When the camera application is running, images of objects that are located within the field of view of the optical system(s) 106 may be captured by the image sensor(s) 104. The images that are being captured by the image sensor(s) 104 may be presented on the display 124. For example, one or more images may be sent to the display(s) 124 for viewing by a user. In some configurations, these images may be played back from the memory 122, which may include image data of an earlier captured scene. The one or more images obtained by the electronic device 102 may be one or more video frames and/or one or more still images. In some configurations, the display(s) 124 may present a full field of view of the image sensor(s) 104 and/or a zoom region.

The processor 112 may include and/or implement an image obtainer 114. One or more image frames may be provided to the image obtainer 114. For example, the image obtainer 114 may obtain image frames from one or more image sensors 104. For instance, the image obtainer 114 may receive image data from one or more image sensors 104 and/or from one or more external cameras. As described above, the image(s) may be captured from the image sensor (s) 104 included in the electronic device 102 or may be captured from one or more remote camera(s).

In some configurations, the image obtainer 114 may request and/or receive one or more images (e.g., image frames, etc.). For example, the image obtainer 114 may request and/or receive one or more images from a remote device (e.g., external camera(s), remote server, remote electronic device, etc.) via the communication interface 108. The images obtained from the cameras may be processed by the processor 112 to perform automatic zoom.

The processor 112 may include and/or implement an object tracker 116. One or more of the image frames may be provided to the object tracker 116. The object tracker 116 may track one or more objects in one or more image frames. For example, the object tracker 116 may obtain object tracking information based on tracking the one or more objects. Object tracking information may include location information and/or size information corresponding to a tracked object (e.g., tracking region, bounding region, bounding box, region of interest (ROI), etc.). In some configurations, the object tracker 116 may implement a touch to track technique. For example, a user interface 126 may receive an input (e.g., touch input, mouse click, gesture, etc.) that indicates an object of interest. The indication may be provided to the object tracker 116. The object tracker 116 may determine the location and/or size of a tracking region (e.g., bounding region, bounding box, ROI, etc.) that includes the object of interest. Accordingly, the object tracker 116 may provide the location and the size of the tracking region based on relatively little user input (e.g., one touch) in some configurations. Based on the tracking information, the zoom controller 120 (e.g., automatic zoom) may determine a zooming level and/or a location of a zoom region. Some examples of the object tracker 116 may implement optical flow.

In some configurations, the object tracker 116 may perform object tracking based on a tracking region of a current frame (of the image frames). For example, the object tracker 116 may attempt to track image content (e.g., an object) from frame-to-frame. The object tracking may provide an estimated location of the image content in the subsequent frame. In some configurations, the object tracker 116 may perform motion-based object tracking. For example, the object tracker 116 may determine an object motion (e.g., motion vector(s) corresponding to an object) between frames. In some configurations, the object tracker 116 may not utilize a frame subtraction approach for tracking. For example, frame subtraction may typically need two frames to be taken from the same viewpoint to function properly. Some configurations of the systems and methods disclosed herein may not assume that two frames are taken from the same perspective. For example, it may be assumed that the camera may be in motion in some configurations.

The object tracker 116 may determine a tracking region (e.g., a bounding region, bounding box, ROI, etc.) of a subsequent frame (of the image frames) based on the object tracking. For example, the object tracker 116 may generate a tracking region of the subsequent frame that corresponds to the tracked image content (e.g., according to the motion vector(s) corresponding to the tracked object). In some configurations, the object tracker 116 may utilize one or more features (e.g., feature vectors) extracted from the current frame tracking region to determine a corresponding subsequent frame tracking region. For example, the object tracker 116 may extract one or more features based on a tracking region (e.g., a detected tracking region, a tracking region corresponding to a user input, etc.).

The processor 112 may include and/or implement a global motion estimator 118. For example, a global motion estimation approach is utilized to estimate the motion of the camera. The global motion estimator 118 may estimate global motion (e.g., perform global motion estimation) between frames. Global motion may be the motion of content (e.g., all content or the content in general) between frames. Global motion information may be an indicator and/or estimate of global motion. In some configurations, determining global motion information may include computing one or more motion vectors between frames (with optical flow, for example). For instance, the global motion vectors may span a large portion of the frame. In some configurations, global motion vectors may cover a particular proportion of a frame. For example, the global motion vectors may span and/or consider 90% of the image (and may ignore borders, for instance). In some configurations, global motion vectors may be determined in a grid pattern over the image. The global motion may be determined based only on the input images in some approaches (without other input motion information, such as motion information from motion sensors like accelerometers and/or gyros, for example).

In some configurations, the global motion estimator 118 may additionally or alternatively estimate global motion based on other motion sensor data (besides image data, for example). For instance, the electronic device 102 may include one or more accelerometers, gyros, and/or other motion sensors. The motion data sensed by the motion sensor(s) may be provided to the global motion estimator 118. The global motion estimator 118 may determine global motion information (e.g., a global motion estimate) based on the motion data in some configurations. In some configurations, global motion information may be determined independent of mechanical control. For example, the global motion information may not be based on a mechanical control signal (e.g., a signal that controls mechanical actuators for moving a camera (e.g., pan and tilt)). For instance, estimating global motion may not be deterministic, where a motion control signal is known.

The processor 112 may include and/or implement a zoom controller 120. The zoom controller 120 may perform automatic zoom. For example, the zoom controller 120 may control location, motion, motion response speed, size, and/or zoom level of a zoom region. A zoom region may be a region within the full field of view of the image sensor(s) 104 and/or a remote camera. For example, the zoom region may be a sub-region of the full field of view (and may be relative to the full field of view, for example). The image content within the zoom region may be magnified (e.g., digitally scaled and/or enhanced, etc.) in order to enlarge the image content. In some configurations, performing automatic zoom may be based on global motion information and/or object tracking information. The zoom controller 120 may perform automatic zoom in accordance with one or more functions, procedures, and/or approaches described in connection with one or more of FIGS. 2-9.

In some configurations, the electronic device 102 may be capable of determining tracking information, movement of the object, and/or movement of the camera in the real world. Such information may be used to improve a zooming location calculation and/or scene stability.

The systems and methods disclosed herein may utilize one or more aspects of an improved zooming strategy. For example, the zooming strategy may be capable of following the object of interest and/or may aim at stabilizing overall scene movement. For instance, the zoomed region may be determined based on the foreground (tracked object) and/or global motion (e.g., camera motion). When the size of the tracking region (e.g., bounding region, bounding box, etc.) changes, the view may be updated smoothly such that the object of interest appears with a reasonable ratio in the zoom region. In cases that the tracked object is missing in the frame or the tracker has lost tracking, the zooming strategy can smoothly fall back to the original field of view (e.g., full field of view), where the quality is not worse than when no automatic zoom is provided.

The systems and methods disclosed herein may implement one or more of the following features. For example, the electronic device 102 may perform tracking-based automatic zoom. In some configurations, the zoom controller 120 may perform automatic zoom with a tracking (e.g., region of interest (ROI))-driven zooming effect. For example, the zooming effect may be automatically changed based on the movement, location, and/or size of the tracked object (e.g., tracking region). In some configurations, the object tracking may operate on (e.g., cover) the whole field of view of the camera. For example, object tracking may be based on a full field of view of a camera input (even when the zoom region does not include the full field of view, for instance). Additionally or alternatively, the zoom controller 120 may adjust a zoom level from frame-to-frame based on object motion.

In some configurations, a minimal user input may be utilized. For example, object tracking (e.g., object tracking by the object tracker 116) may be based on a single object indication (e.g., one indication of a single pixel). For instance, the object tracker 116 may utilize a location (e.g., pixel) indicated by a received input. In some examples, the object tracker 116 may utilize a one-touch input to select an object of interest. In other approaches, the object tracker 116 may use a location (e.g., pixel) indicated from a mouse click input, a touch pad tap input, an eye tracking location, or a gesture input, for example. The object tracker 116 may then automatically track the object of interest during preview and/or video capture.

In some configurations, full field of view processing and/or display may be implemented. For example, object tracking (by the object tracker 116, for instance) may run on the original camera field of view (e.g., the entire image captured by a camera (e.g., image sensor 104 and optical system) without narrowing the field of view). Accordingly, the object(s) of interest may move in the wide angle field of view (which may be the same as that of the camera sensor) while the zoom region (which has an enlarged and more focused field of view) may be presented and/or captured on the device. For example, the zoom region may include a subset of the full field of view. Even when the zoom region is a subset of the full field of view, the tracking may be performed based on the full field of view (e.g., may consider, process, and/or take into account the full field of view). It should be noted that zoom region motion and/or zoom region motion response speed may be relative to the full field of view. In some approaches, the zoom region and the full field of view may be provided from the same image sensor (e.g., camera).

In some configurations, the systems and methods disclosed herein (e.g., the zoom controller 120) may implement improved stabilization. By taking advantage of the global motion estimation, for example, one or more stabilization approaches may be applied to reduce jitters caused by motion (e.g., users). Accordingly, a more stabilized result may be generated.

In some configurations, the systems and methods disclosed herein (e.g., the zoom controller 120) may provide a smooth zooming ratio transition. The zooming ratio may be related to the size of object(s) and/or may be stabilized based on scaling history, which may result in a smooth zooming ratio transition and a good visual effect. In some configurations, the zoom (e.g., zoom factor, magnification, etc.) may be based on a tracking region size and a zoom region size. For example, the zoom level may be based on a size ratio of the tracking region and the zoom region. For instance, the zoom controller 120 may increase the zoom in a case that the size ratio is less than a minimum zoom threshold. Additionally or alternatively, the zoom controller 120 may decrease the zoom in a case that the size ratio is greater than a maximum zoom threshold. The maximum zoom threshold and the minimum zoom threshold may be the same or may be different. For example, there may be a range between the minimum zoom threshold and the maximum zoom threshold. A more specific example of controlling the zoom is given in connection with FIG. 8.

In some configurations, the zoom controller 120 may determine a zoom region motion based on global motion information. For example, the motion of the zoom region between frames or the location of the zoom region (in a current frame, for instance) may be determined based on the global motion (between a previous frame and the current frame, for instance). In some approaches, the zoom region motion (e.g., the zoom region location in the current frame) may be based on the current frame global motion (e.g., the global motion from a previous frame to the current frame). Global motion of one or more previous frames (e.g., global motion between a previous frame and a frame before the previous frame, global motion between earlier previous frames, etc.) may be utilized to determine zoom region motion in some approaches. In some approaches, the zoom controller 120 may determine the zoom region motion based on a sum of a global motion and a difference between a current frame zoom region anchor point and a previous frame zoom region anchor point. Additionally or alternatively, the zoom controller 120 may determine the zoom region motion based on a global motion, a difference between a current frame zoom region anchor point and a previous frame zoom region anchor point, a previous frame global motion, and a difference between a previous frame zoom region anchor point and an earlier frame zoom region anchor point. More specific examples of determining zoom region motion based on global motion information are given in connection with FIG. 4. The zoom controller 120 may utilize global motion information (e.g., global motion) to determine (e.g., calculate, compute, etc.) the zoom region motion in accordance with zoom region motion speed and/or zoom region acceleration. In some configurations, the zoom region motion may not drive mechanical pan, tilt, and/or zoom (e.g., motors, actuators, etc., for pan, tilt, and/or zoom).

Additionally or alternatively, the zoom controller 120 may determine the zoom region motion based on a distance between a tracked object (e.g., tracking region, tracking region anchor point, etc.) and an anchor point of the zoom region. For example, the zoom controller 120 may determine the zoom region motion based on a distance between a current frame tracked object (e.g., current frame tracking region anchor point) and a current frame anchor point of the zoom region. The distance between the tracked object and the zoom region anchor point may be determined by the zoom controller 120. In some configurations, the zoom controller 120 may determine the zoom region motion additionally or alternatively based on a distance between a previous frame tracked object (e.g., previous frame tracking region anchor point) and a previous frame anchor point of the zoom region. More specific examples of determining zoom region motion based on global motion information are given in connection with FIG. 4. The zoom controller 120 may utilize tracking information (e.g., tracking region anchor point) to determine (e.g., calculate, compute, etc.) the zoom region motion in accordance with a distance of a tracking region (e.g., tracking region anchor point) and a zoom region anchor point and/or a rate of change of the distance (and/or of the zoom region).

In some configurations, the zoom controller 120 may compensate for global motion in a case that the zoom region enters a border buffer zone and a tracked object is moving toward an image boundary. For example, the zoom controller 120 may determine the current frame zoom region anchor point based on a previous frame zoom region anchor point and global motion. A more detailed example of compensating for global motion in this case is given in connection with FIG. 7.

In some configurations, the zoom controller 120 may determine a zoom region motion response speed based on a location of a tracked object within a zoom region. For example, the zoom controller 120 may control the horizontal and/or vertical translation of the zoom region (within the field of view, for instance). In some approaches, the region motion response speed may vary based on the location of the tracked object (e.g., tracking region) within the zoom region. For example, the zoom controller 120 may adjust the zoom region motion response speed (e.g., translation response speed) depending on the proximity between the tracked object (e.g., tracking region) and the border of the zoom region. In some configurations, the zoom region motion response speed may be slower near the center of the zoom region and may be faster near the edge of the zoom region. In this way, the zoom region may follow the motion of the tracked object (e.g., tracking region) slowly near the center of the zoom region. This may allow for smooth and slow motion while the object is near the center of the zoom region. The zoom region may follow the motion of the tracked object (e.g., tracking region) quickly as the object nears the edge of the zoom region. This approach may help to ensure that the zoom region can quickly follow the tracked object as the object nears the border of the tracking region.

In some configurations, determining the zoom region motion response speed may be based on two or more zones within the zoom region. Each zone may have an associated zoom region motion response speed. In one example, the zoom region 540 may include two zones. A first zone may be a slow response zone and a second zone may be a fast response zone. The slow response zone may be located centrally in the zoom region. The fast response zone may be located near the edges of the zoom region. For example, the fast response zone may surround or encircle the slow response zone. In some implementations, the slow response zone may be a rectangular zone centered in the zoom region and the fast response zone may lie between the slow response zone and the border of the zoom region. While the tracked object (e.g., the tracking region) is within the slow response zone, the zoom region may have a relatively slower zoom region motion response speed. When the tracked object (e.g., the tracking region) enters the fast response zone (partially or completely, for example), the zoom region may have a relatively faster zoom region motion response speed. An example of two zones is described in connection with FIG. 6. It should be noted that a different number of zones may be utilized. For example, two or more zones may each have a corresponding zoom region motion response speed (e.g., one or more weights). The two or more zones may be arranged such that each additional zone beyond a central zone encircles or surrounds the last zone (in a circular or rectangular "bullseye" pattern, for example).

In some configurations, the zoom region motion response speed may be controlled with multiple weights. For example, one or more weights may correspond to each of the response zones (e.g., a first set of weights for the slow response zone and a second set of weights for the fast response zone) and/or may indicate a particular zoom region response speed. For instance, the zoom controller 120 may select the one or more weights corresponding to the zone in which the tracked object (e.g., tracking region) is currently located. The selected weight(s) may implement the corresponding zoom region response speed. Examples of weights are described in connection with FIG. 4.

In some configurations, the zoom region motion response speed may be determined based on a continuous function of the location of the tracked object (e.g., tracking region) relative to the zoom region. For example, the continuous function may map a location of the tracked object to a zoom region motion response speed. For example, the zoom motion response speed may be 0 when the tracked object is located at the center of the zoom region and may progressively increase as the tracked object moves further from the center of the zoom region. For instance, the continuous function may map a location of the tracked object (e.g., tracking region) to one or more weights that control the zoom region motion response speed.

In some configurations, a transition zone may be utilized. A transition zone may be a zone between different zoom region motion response zones. The transition zone may serve to prevent jittering and/or rapid switching between different zoom region response speeds. For example, the zoom controller 120 may not change a zoom region motion response speed until the tracked object (e.g., tracking region) has crossed the transition zone. An example of a transition zone is described in connection with FIG. 6.

The processor 112 may provide the zoom information (e.g., zoomed region information, the cropped zoom region, etc.). For example, the processor 112 may provide the zoom region to the display(s) 124 for presentation. Additionally or alternatively, the processor 112 may send the zoom region to another device (via the communication interface 108, for instance). In some configurations, the zoom region (e.g., the cropped zoom region) may be presented. The zoom region may occupy only a portion (e.g., picture-in-picture (PiP), picture and picture, etc.) of a view of the display 124 in some approaches. For example, the zoom region may be presented on top of the full field of view. In other approaches, the zoom region may occupy the entire view. For example, the full field of view may not be shown when the zoom region is zoomed in. It should be noted that the object tracking may operate on the full field of view, whether or not the full field of view is presented.

Some configurations of the systems and methods disclosed herein may be digital zoom approaches (e.g., purely digital zoom approaches). For example, performing automatic zoom may not include changing optical zoom (e.g., focal length) in some approaches. Accordingly, the full field of view size and/or the optical system focal length may be static (although the viewpoint, camera motion, and/or scene may change from frame-to-frame). For instance, performing automatic zoom may be accomplished separately and/or independently from optical zoom (e.g., may not utilize focal length) in some approaches. It should be noted that performing automatic zoom may be performed in conjunction with optical zoom in some configurations.

The memory 122 may store instructions and/or data. The processor 112 may access (e.g., read from and/or write to) the memory 122. Examples of instructions and/or data that may be stored by the memory 122 may include image data (e.g., zoom region data), image obtainer 114 instructions, zoom controller 120 instructions, object tracker 116 instructions, and/or global motion estimator 118 instructions, etc.

The memory 122 may store the images and instruction codes for performing operations by the processor 112. The memory 122 may be any electronic component capable of storing electronic information. The memory 122 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data and instructions may be stored in the memory 122. The instructions may be executable by the processor 112 to implement one or more of the methods described herein.

Executing the instructions may involve the use of the data that is stored in the memory 122. When the processor 112 executes the instructions, various portions of the instructions may be loaded onto the processor 112, and various pieces of data may be loaded onto the processor 112.

In some configurations, the electronic device 102 may present a user interface 126 on the display 124. For example, the user interface 126 may enable a user to interact with the electronic device 102. In some configurations, the user interface 126 may enable a user to select an object (for tracking and/or zooming) and/or indicate preferences for zooming behavior. For example, the user interface 126 may receive a touch, a mouse click, a gesture and/or some other indication that identifies an object for tracking and/or zooming.

The display(s) 124 may be integrated into the electronic device 102 and/or may be coupled to the electronic device 102. For example, the electronic device 102 may be a smartphone with an integrated display. In another example, the electronic device 102 may be coupled to one or more remote displays 124 and/or to one or more remote devices that include one or more displays 124.

The electronic device 102 (e.g., processor 112) may optionally be coupled to, be part of (e.g., be integrated into), include and/or implement one or more kinds of devices. For example, the electronic device 102 may be implemented in a drone equipped with cameras. In another example, the electronic device 102 (e.g., processor 112) may be implemented in an action camera.

It should be noted that one or more of the elements or components of the electronic device may be combined and/or divided. For example, the image obtainer 114, the zoom controller 120, the object tracker 116 and/or the global motion estimator 118 may be combined. Additionally or alternatively, one or more of the image obtainer 114, the zoom controller 120, the object tracker 116 and/or the global motion estimator 118 may be divided into elements or components that perform a subset of the operations thereof.

Figure 2:
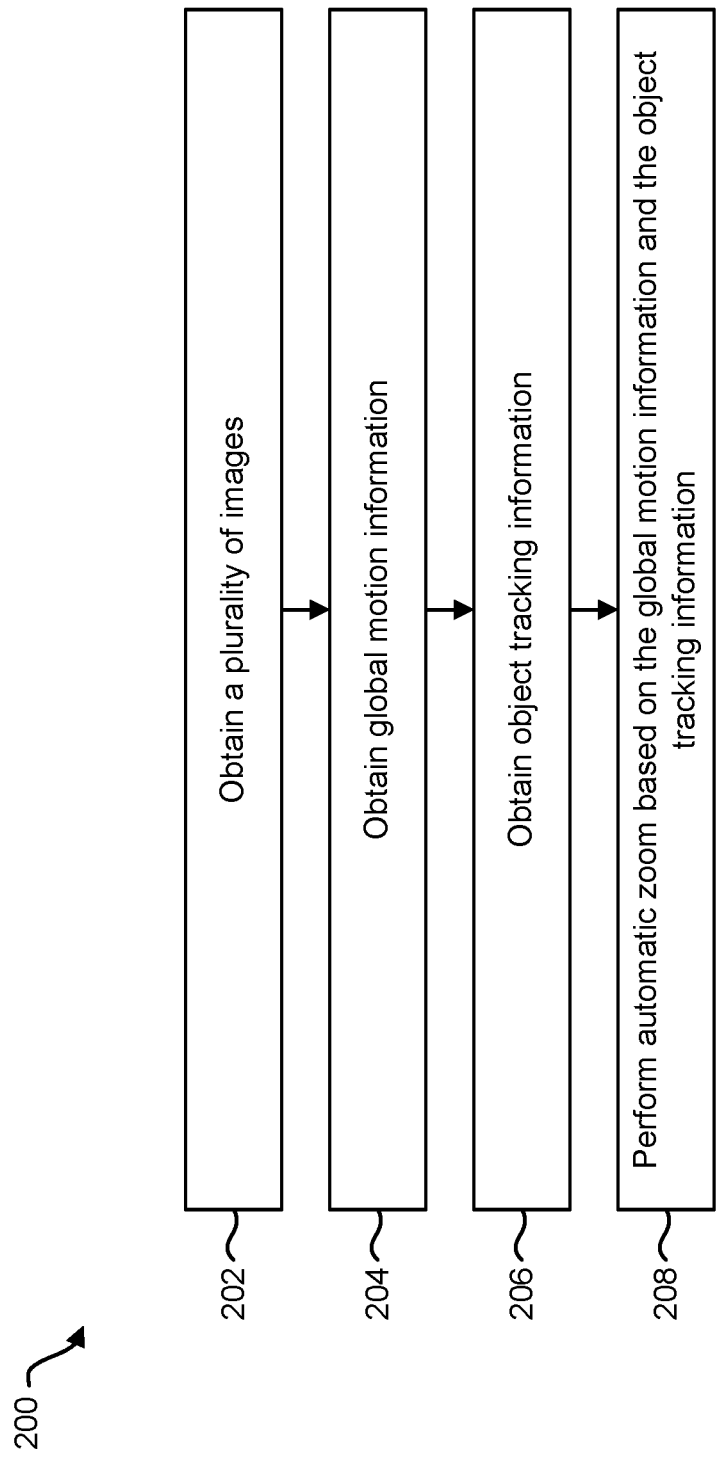
FIG. 2 is a flow diagram illustrating one configuration of a method for performing automatic zoom.

FIG. 2 is a flow diagram illustrating one configuration of a method 200 for performing automatic zoom. The method 200 may be performed by one or more of the electronic devices described herein (e.g., the electronic device 102 described in connection with FIG. 1). The electronic device 102 may obtain 202 a plurality of images (e.g., still images, video frames, etc.). This may be accomplished as described in connection with FIG. 1. For example, the electronic device 102 may capture a plurality of images with one or more integrated image sensors (e.g., cameras) and/or may receive a plurality of images from a remote device.

The electronic device 102 may obtain 204 global motion information. This may be accomplished as described in connection with FIG. 1. For example, the electronic device 102 may determine a global motion estimate based on movement between subsequent images (with optical flow, for instance) and/or based on motion information from one or more motion sensors. The global motion information may indicate whether and/or how the camera and/or image content have moved between images.

The electronic device 102 may obtain 206 object tracking information. This may be accomplished as described in connection with FIG. 1. For example, the electronic device 102 may track an object between images. The object tracking information may indicate whether and/or how an object has moved between images. For example, the object tracking information may include a region of interest in the current frame, motion vector(s), etc., that indicate the motion of an object.

The electronic device 102 may perform 208 automatic zoom based on the global motion information and the object tracking information. This may be accomplished as described in connection with FIG. 1. For example, the electronic device 102 may perform one or more of the procedures described in connection with one or more of FIGS. 1 and 3-9. For instance, the electronic device 102 may (or may not) adjust the zoom factor. Additionally or alternatively, the electronic device 102 may (or may not) adjust the zoom region location based on the zoom region motion response speed and the location of the tracked object (e.g., tracking region). In some configurations, the electronic device 102 may determine the zoom region motion response speed. For example, the electronic device 102 may determine a relatively slower zoom region motion response speed when the tracked object is near the center of the zoom region and may determine a relatively faster zoom region motion response speed when the tracked object is near the border or edge of the zoom region. Performing 208 automatic zoom may produce and/or update the zoom region.

In some configurations, the electronic device 102 may present the zoom region. For example, the electronic device 102 may present the zoom region on a display (e.g., an integrated or remote display).

Figure 3:
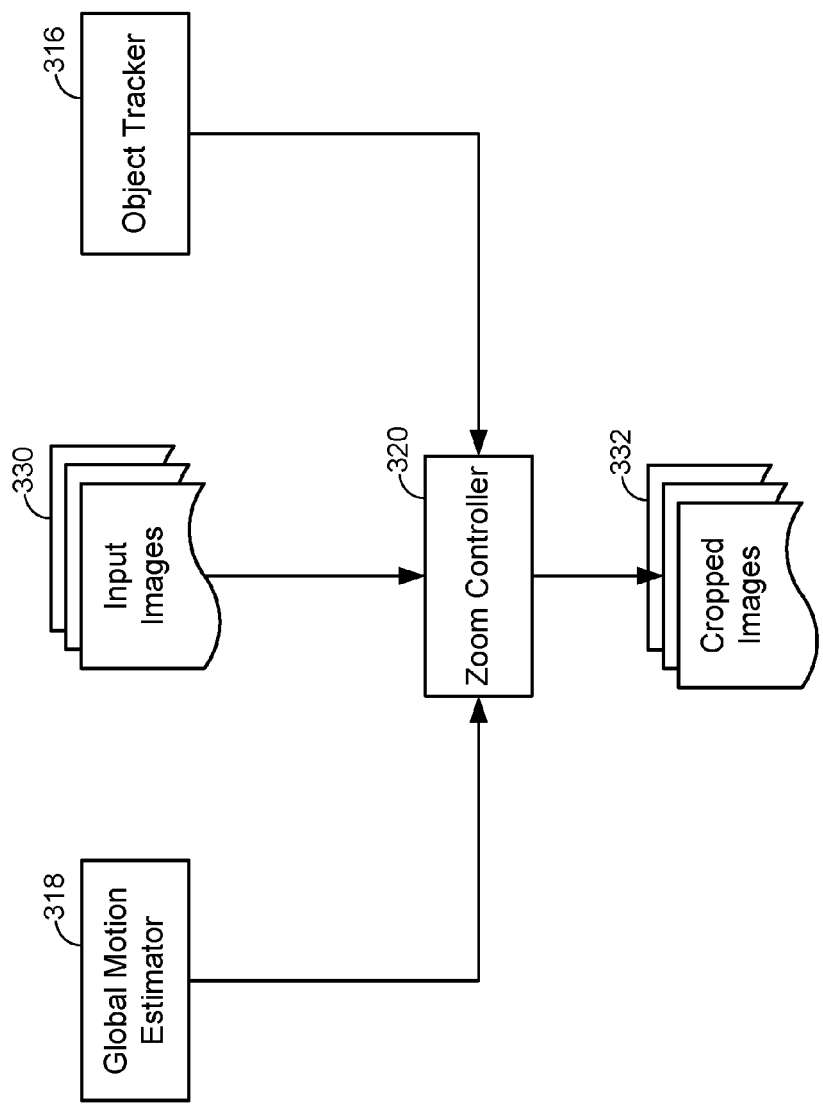
FIG. 3 is a block diagram illustrating one example of an automatic zoom pipeline.

FIG. 3 is a block diagram illustrating one example of an automatic zoom pipeline. In particular, FIG. 3 illustrates a global motion estimator 318, an object tracker 316, and a zoom controller 320. The global motion estimator 318, the object tracker 316, and/or the zoom controller 320 may be examples of corresponding elements described in connection with one or more of FIGS. 1 and 2.

Input images 330 (e.g., input frames) may be provided to the global motion estimator 318, to the object tracker 316, and/or to the zoom controller 320. The global motion estimator 318 may estimate the motion of the camera and/or image content. For example, the global motion estimator 318 may compute the inter-image (e.g., inter-frame) camera motion. The resulting global motion information may reflect the camera movement in the real world, which may be utilized to improve zooming location calculation and/or scene stability as described above.

The object tracker 316 (e.g., touch-to-track object tracker 316) may compute the object motion in the input images 330 (e.g., frames) and the object size in the input images 330 (e.g., frames). In some configurations, the object tracker 316 may implement a touch to track technique. For example, with a minimal user input (e.g., one touch), the object tracker 116 may determine the location and/or size of a tracking region (e.g., bounding region, bounding box, etc.) that includes the object of interest. Based on the tracking information, the zoom controller 320 (e.g., automatic zoom) may determine a zooming level and/or a location of a zoom region.

The zoom controller 320 may leverage the global motion information (e.g., information of camera motion) and object tracking information (e.g., target object motion information) to compute the location and/or size of the zoom region (e.g., cropped frame) under the smoothness constraints on the cropped video. The zoom controller 320 may implement one or more of the aspects of the improved zooming strategy described above. For example, the zoom controller 320 may control the zoom region in order to follow an object of interest and/or stabilize overall scene movement. Additionally or alternatively, the zoom controller 320 may smoothly update the field of view when the size of the tracking region changes (to keep the object of interest at a reasonable size ratio to the zoom region). Additionally or alternatively, the zoom controller 320 may smoothly return to the original field of view when the tracked object is missing in an image (e.g., frame) and/or when tracking is lost. The zoom controller 320 may produce cropped images 332 (e.g., cropped frames). For example, the zoom controller 320 may crop and/or scale (and/or control another element to crop and/or scale) the input images 330 according to the zoom region. For instance, the zoom controller 320 may crop and/or discard any image content that is outside of the zoom region. In some configurations, the zoom controller 320 may scale the cropped images 332 to a particular size (e.g., the size of a display, the size of a window on a display, etc.).

Figure 4:
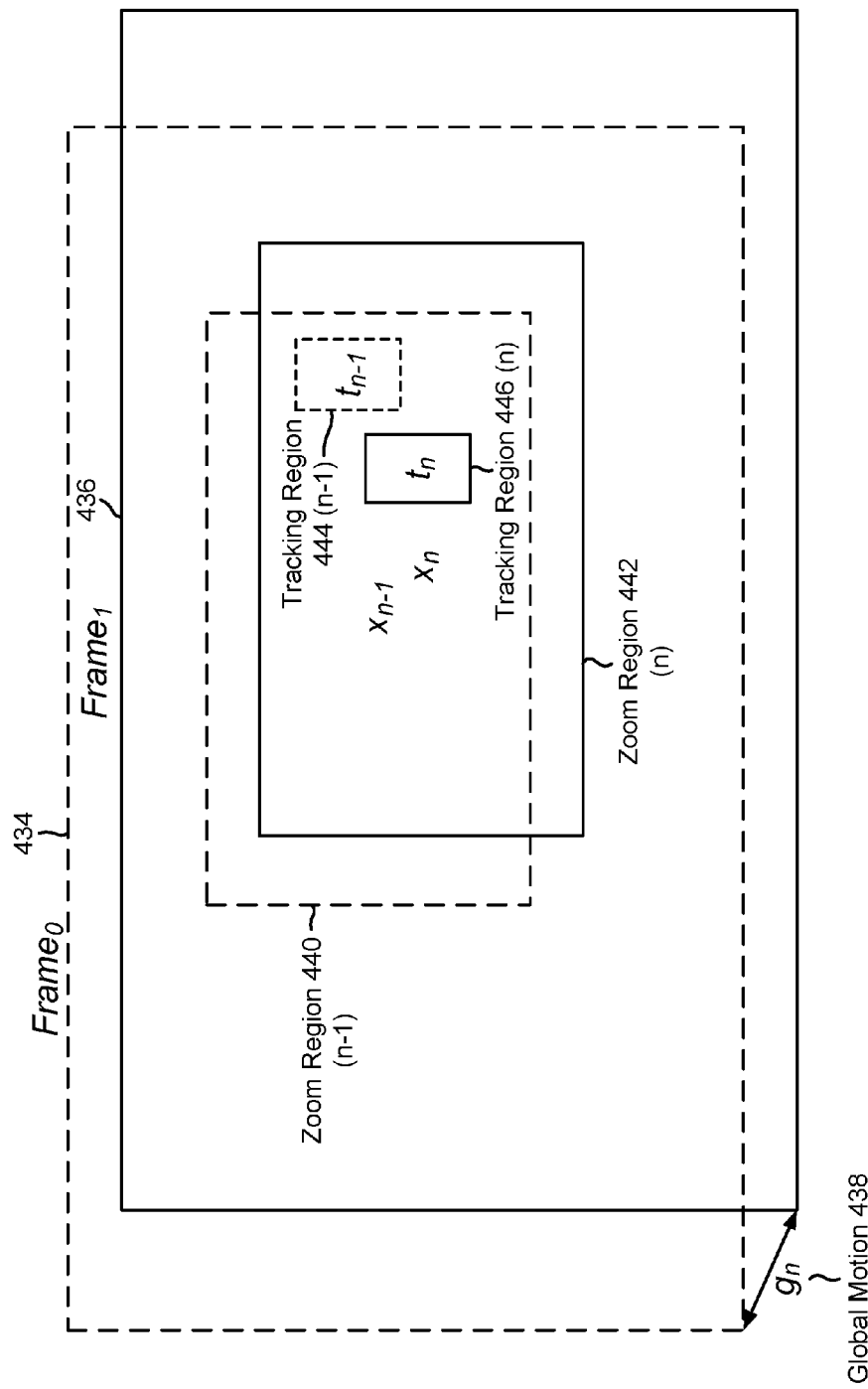
FIG. 4 is a diagram illustrating an example of determining the zoom region.

FIG. 4 is a diagram illustrating an example of determining the zoom region. In particular, FIG. 4 illustrates a previous frame 434 (e.g., Frame( ) and a current frame 436 (e.g., Frame$_1$). As shown in FIG. 4, global motion 438 (e.g., global motion g$_n$ between the previous frame 434 and the current frame 436) may occur between frames. For example, the global motion 438 may be due to movement of the camera (from hand movement of a user carrying a smartphone, for example). FIG. 4 also illustrates a previous frame zoom region 440 and a current frame zoom region 442 (e.g., an updated zoom region). The previous frame zoom region 440 may include a previous frame tracking region 444 (e.g., an ROI, bounding box, etc.). The current frame zoom region 442 may include a current frame tracking region 446.

In FIG. 4, x$_i$ is a zoom region anchor point (e.g., the center) location of the zoom region, t$_i$ is a tracking region anchor point (e.g., center) location of the tracking (e.g., tracking region), and the unknown parameter is x$_n$ (e.g., the zoom region anchor point for the current image or frame), where i is a frame index and n is a current frame number. It should be noted that any point (e.g., anchor point) in the zoom region may be utilized as a reference for measuring distance. A center point or location may be one example of an anchor point. Additionally or alternatively, t$_i$ may be a point in the tracking region other than the center of the tracking region in some configurations. In order to capture the tracked object in the zoom region, v(x) may be formulated, which describes the distance of the tracking center and the anchor point of the zoomed region and its rate of change. In some configurations, v(x) may be expressed as given in Equation (1).

$$v(x_n) = a_0(t_n - x_n)^2 + a_1[(t_n - x_n) - (t_{n-1} - x_{n-1})]^2 \quad (1)$$

In order to make the zoomed region steady, it may be beneficial to formulate h(x), which describes the motion speed and acceleration of the zoom region. In some configurations, h(x) may be expressed as given in Equation (2). It should be noted that the global motion g$_n$ may be expressed in terms of one or more dimensions (e.g., horizontal and vertical motion).

$$h(x_n) = b_0[g_n + (x_n - x_{n-1})]^2 + b_1[g_n + (x_n - x_{n-1}) - g_{n-1} - (x_{n-1} - x_{n-2})]^2 \quad (1)$$

The zoom region may have an anchor point x$_n$ that minimizes the function $f$. In some configurations, $f$ may be expressed as given in Equation (3).

$$f(x) = v(x) + h(x) \quad (3)$$

The four coefficients a$_0$, a$_1$, b$_0$, and b$_1$ may control how the zoomed region behaves. For example, the coefficients may be selected to trade a fast response (e.g., response speed) to object motion with a high inertial state to keep the zoom region more static. In some configurations, a$_0$+a$_1$+b$_0$+b$_1$=1. Larger a values may increase the zoom region motion response speed (and may increase jitter, for example), whereas larger b values may decrease the zoom region motion response speed (e.g., increase smoothness). In some approaches, the electronic device 102 may determine a response speed (e.g., may select coefficients) depending on where the object is inside the zoom region (e.g., cropped box). The zoom region motion response speed may refer to the translation (e.g., vertical and/or horizontal movement, x-y movement, etc.) of the zoom region relative to the tracked region. For example, a high zoom region motion response speed will closely follow the tracked region, whereas a low zoom region motion response speed will lag behind the tracked region (but will exhibit smooth motion, for instance). Different behavior may be beneficial depending on where the object is within the zoom region.

Figure 5:
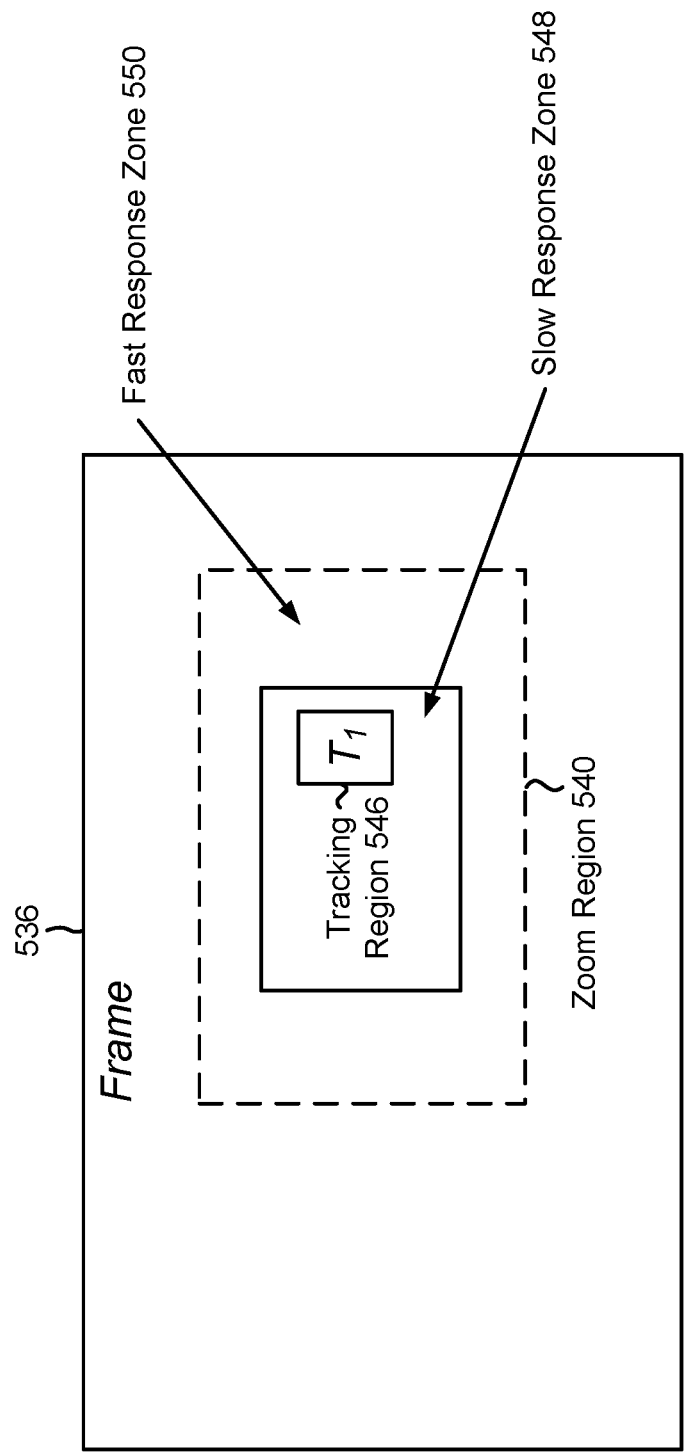
FIG. 5 illustrates an example of a two-state approach with two zones.

FIG. 5 illustrates an example of a two-state approach with two zones. In particular, FIG. 5 illustrates a frame 536, a zoom region 540, and a tracking region 546. In this two-state approach, the zoom region motion response speed may differ based on the location of the object (e.g., the tracking region 546) in the zoom region 540 (e.g., cropped region). For example, the coefficients a$_i$ and b$_i$ may be determined based on the state of the zoom region 540 (e.g., based on the location of the tracking region 546 relative to the zoom region 540). When the tracked object is within (e.g., moves within) a slow response zone 548 (e.g., a high inertial zone that may include a central area) of the zoom region 540, more weight is given to weights b$_i$ such that that the overall scene is more stabilized (e.g., such that the zoom region 540 responds slowly to tracking region 546 motion).

When the tracked object (e.g., tracking region 546) is in the fast response zone (e.g., moves outside of the slow response zone 548 partially or completely) of the zoom region 540, more weight is given to weights a$_i$ so that the zoom region 540 can quickly follow the object of interest (e.g., the tracking region 546) and move the object back into the slow response zone 548 (e.g., central zone). The two-state approach may insure that the zoom region 540 (e.g., cropped frame) does not jitter when an object moves (e.g., has small, repetitive motions) within the slow response zone 548.

Figure 6:
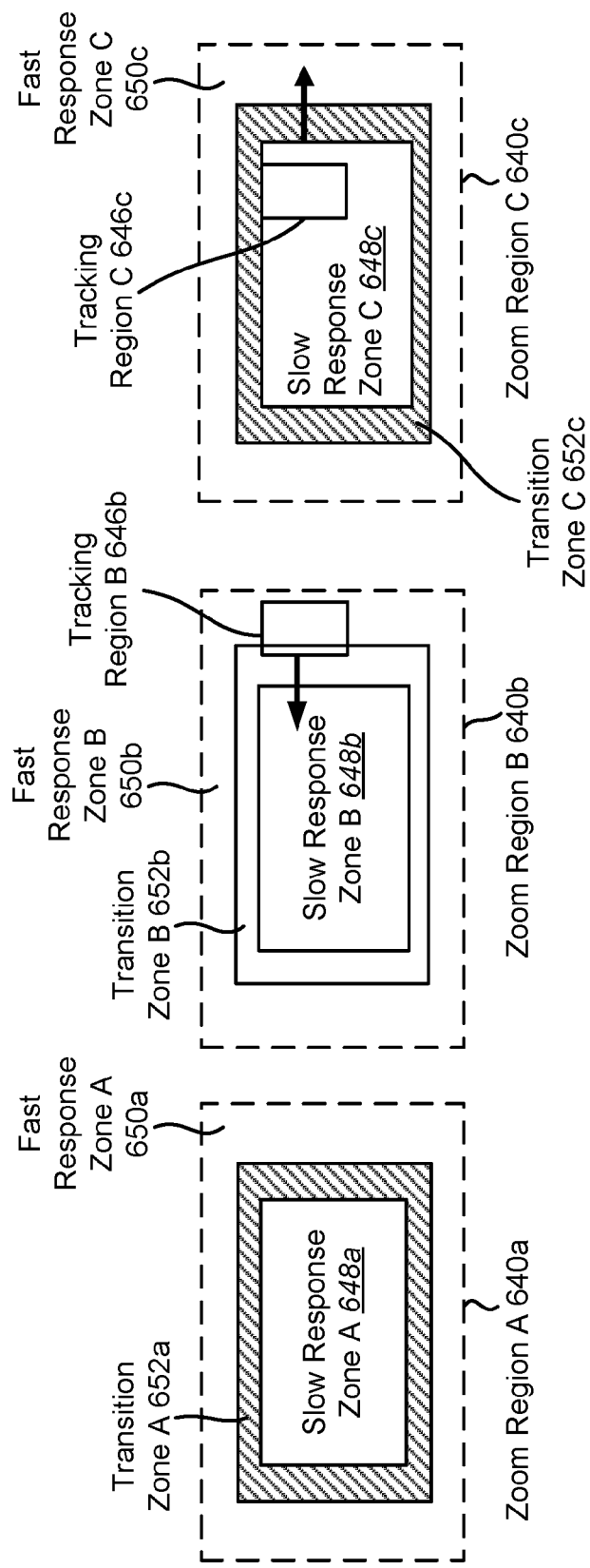
FIG. 6 illustrates an example of transition zones.

FIG. 6 illustrates an example of transition zones A-C 652a-c. To further avoid jittering when tracking falls in and out of the different response zones (e.g., regions), multiple zones may be utilized. As illustrated in FIG. 6, zoom region A 640a includes three zones: slow response zone A 648a (or inner zone), transition zone A 652a (or intermediate zone) around slow response zone A 648a, and fast response zone A 650a (or outer region). As illustrated in zoom region B 640b, when the previous state is a fast response state corresponding to fast response zone B 650b, (e.g., a follow state where the tracked object was in fast response zone B 650b, for example), the tracked object (e.g., tracking region B 646b) may have to reach slow response zone B 648b (or an inner region or high inertial zone, for example) in order to change to a slow response state. For example, tracking region B 646b may have to cross transition zone B 652b to change to the slow response state. As illustrated in zoom region C 640c, the tracked object (e.g., tracking region C 646c) may have to go out of transition zone C (e.g., enter fast response zone C 650c) to follow. For example, the zoom region motion speed (e.g., state) may not change unless the tracking region 646 leaves (or crosses, for instance) the transition zone. This may help to avoid jitter (e.g., rapid switching between states).

Figure 7:
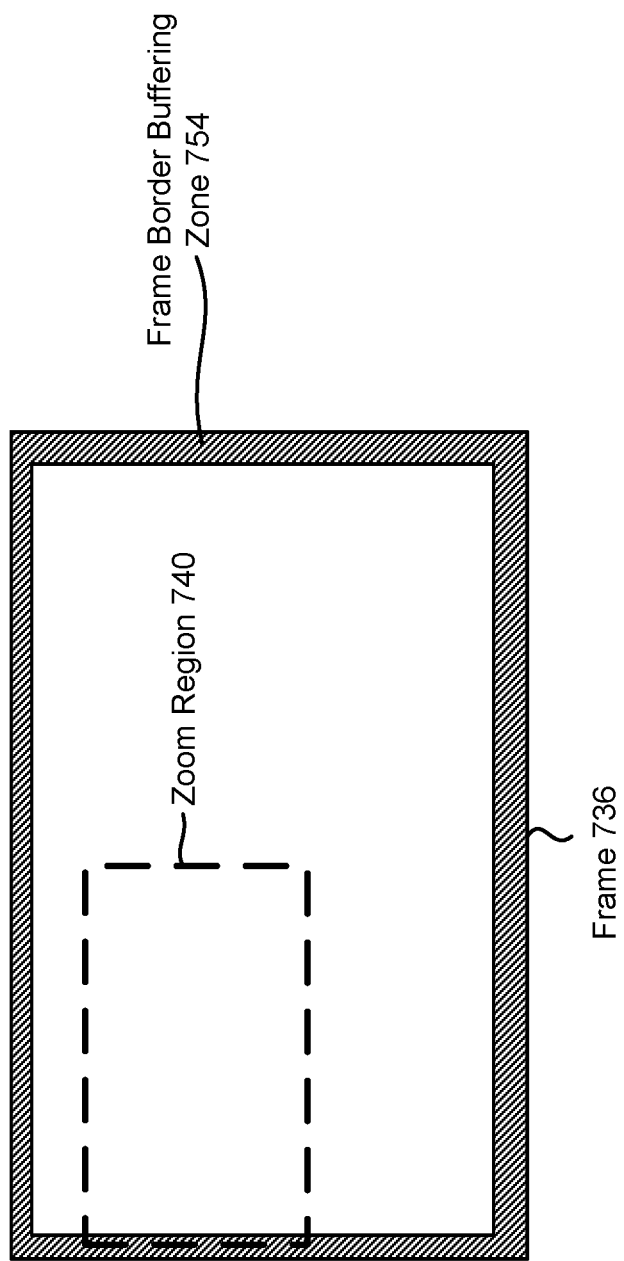
FIG. 7 is a diagram illustrating one example of a frame border buffering zone.

FIG. 7 is a diagram illustrating one example of a frame border buffering zone 754. A frame border buffering zone 754 may be utilized in some approaches to compensating for global motion. In FIG. 7, the outermost box represents a frame 736 (e.g., a frame of a full field of view). A frame border buffering zone 754 is illustrated at the periphery within the frame 736. The frame border buffering zone 754 may be utilized to enhance stabilization. When a zoom region 740 (e.g., cropped region) enters the frame buffering zone 754, global motion may only be compensated for if the object moves towards the boundary (e.g., the frame edge). In this way, jitter may be reduced. For example, the zoom controller 120 may compensate for global motion to determine the zoom region motion. In some configurations, the zoom controller 120 may perform global motion compensation in accordance with Equation (4).

$$x_n = x_{n-1} - g_n \qquad (4)$$

For example, Equation (4) illustrates a solution when only a portion (e.g., the first half) of Equation (2) is applied. For instance, if the zoom region enters the frame border buffering zone 754 and the object is moving towards the boundary (e.g., the tracking region has a trajectory towards the frame boundary), then Equation (4) may be applied instead of Equations (1) and (2).

Figure 8:
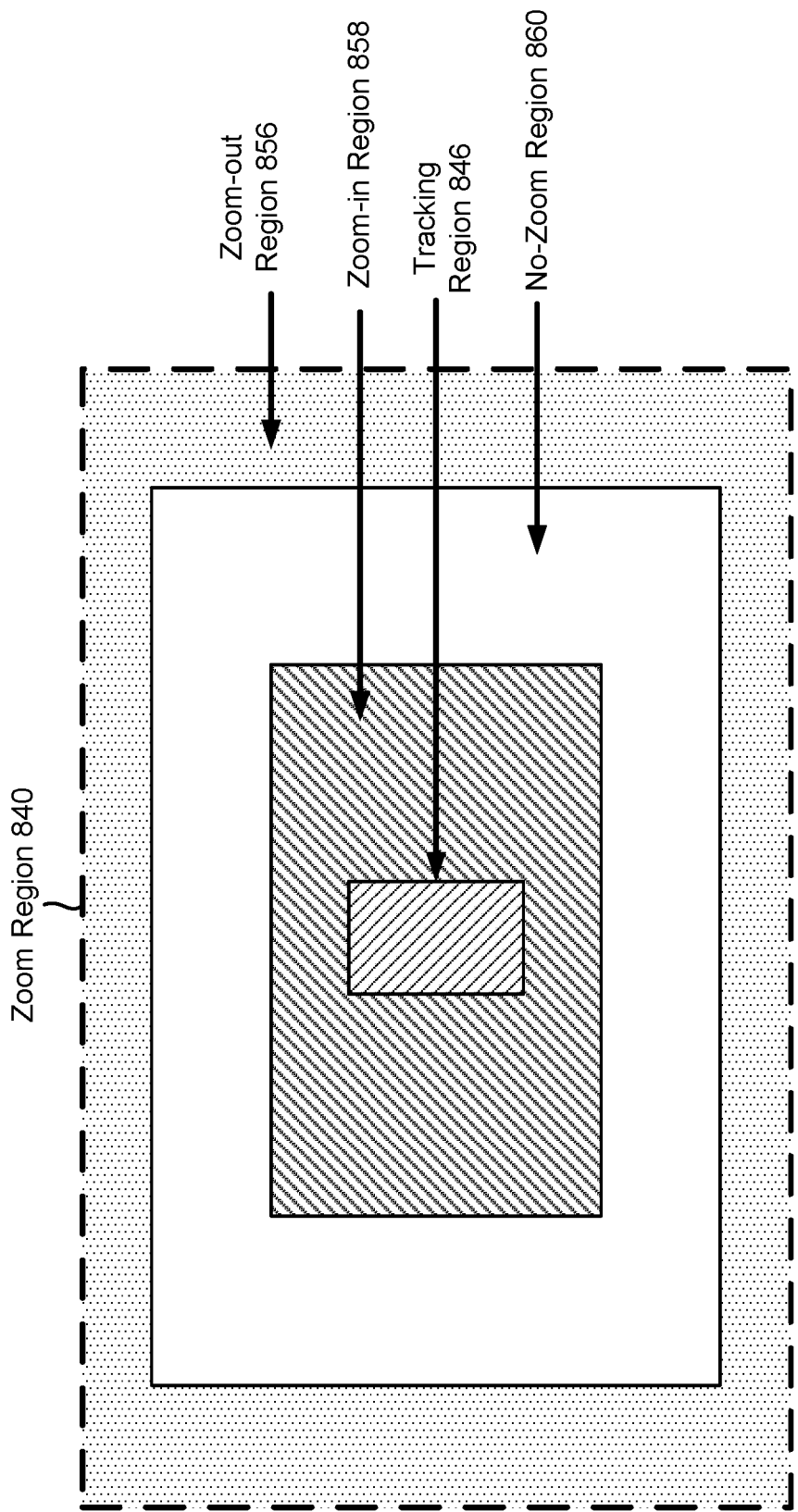
FIG. 8 is an example of an approach for controlling a zoom level.

FIG. 8 is an example of an approach for controlling a zoom level (e.g., zoom factor, scaling, magnification, etc.). The target zoom level may be determined based on a size ratio between the tracking region 846 (e.g., ROI, tracking box, bounding region, bounding box, etc.) and the zoom region 840 (e.g., cropping region). In FIG. 8, the smallest rectangle represents the tracking region 846 (e.g., ROI, tracking box, etc.) and the outer (e.g., largest) rectangle represents the zoom region 840 (e.g., cropping box). In some configurations, a size ratio between the tracking region 846 and the zoom region 840 may be the maximum of width and height ratios. Other size ratios may be utilized. If the size ratio is smaller than the zoom-in region 858 (e.g., minimum zoom threshold), then the zoom level may increase. Otherwise, if the size ratio is larger than the no-zoom region 860 (e.g., maximum zoom threshold) or is within the zoom-out region 856, for example, the zoom level may decrease. There may be a range between the minimum zoom threshold and the maximum zoom threshold. This approach may enhance stability and/or may avoid jitter.

In some configurations, the zoom level Z may be bounded by a range (e.g., [1, max_level]). The zooming level Z may be determined based on a set of criteria. For example, when the current frame tracks the object and provides the region size, a zooming level history table H may be set up to record a certain number (e.g., a certain time period) of zooming levels prior to the current frame. If the zoom level of the previous N frames is not getting smaller, and Z is larger than the previous zoom level $Z_{t-1}$, the current zoom level may be $Z_t = \min(Z_{t-1}+1, \max\_level)$, and vice versa. The history table may ensure that the zoom level is not changing dramatically (thereby producing an unpleasant visual effect).

When the current frame loses track of the object, the current ratio may be held for a number of frames (e.g., 5 frames) and/or may then smoothly zoom out until the whole field of view is shown. Additionally or alternatively, when tracking is lost, the scene may be stabilized by fixing the anchor point of the zoomed region along the zooming out procedure.

Figure 9:
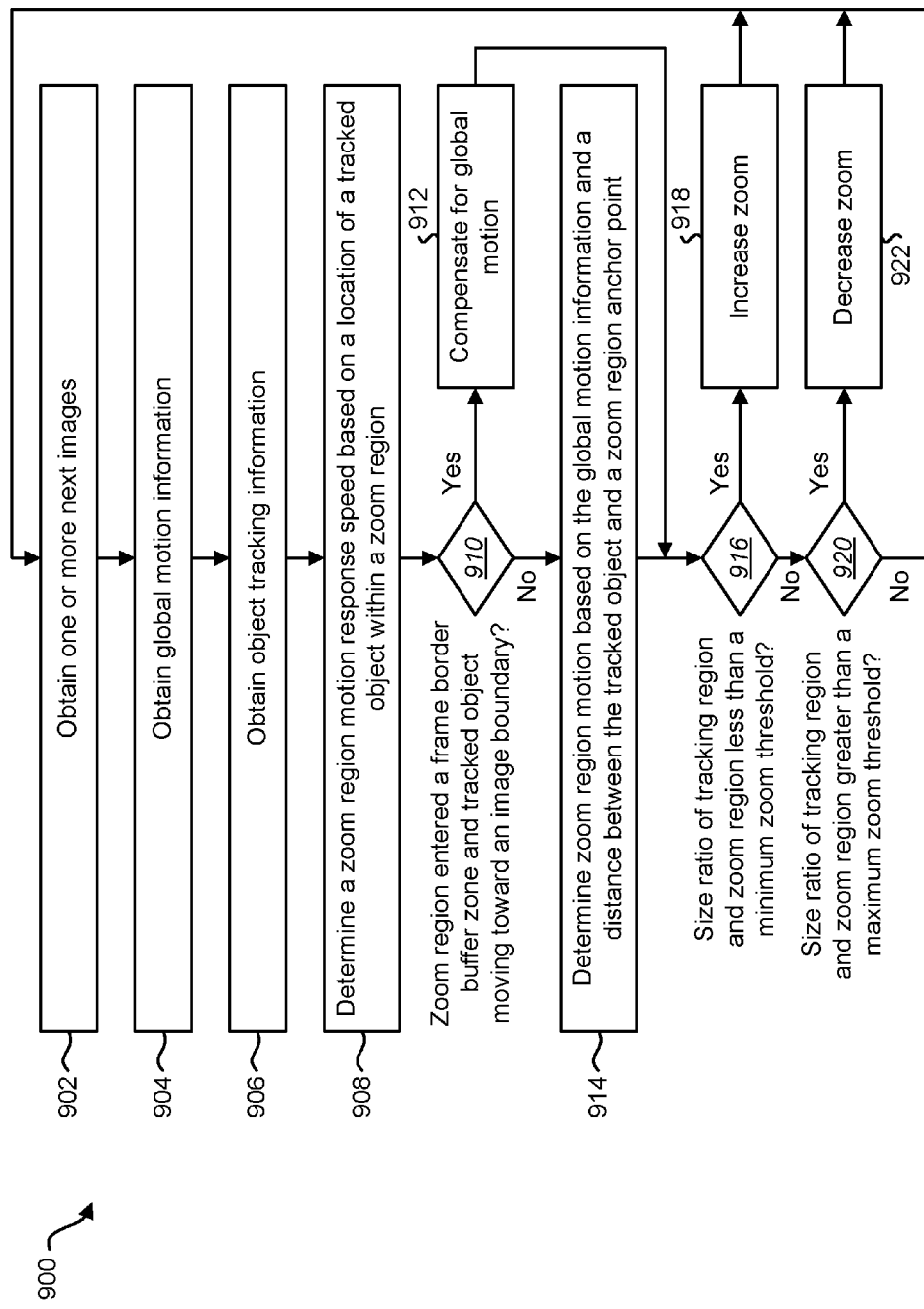
FIG. 9 is a flow diagram illustrating one configuration of a method for performing automatic zoom.

FIG. 9 is a flow diagram illustrating one configuration of a method 900 for performing automatic zoom. The method 900 may be performed by the electronic device 102 described in connection with FIG. 1, for example.

The electronic device 102 may obtain 902 one or more next images. For example, the electronic device 102 may obtain an image subsequent to a previous image that was already obtained. This may be accomplished as described in connection with one or more of FIGS. 1-2.

The electronic device 102 may obtain 904 global motion information. This may be accomplished as described in connection with one or more of FIGS. 1-2.

The electronic device may obtain 906 object tracking information. This may be accomplished as described in connection with one or more of FIGS. 1-2.

The electronic device 102 may determine 908 a zoom region motion response speed based on a location of a tracked object within a zoom region. This may be accomplished as described in connection with one or more of FIGS. 1-6.

The electronic device 102 may determine 910 whether a zoom region has entered a frame border buffer zone and whether the tracked object is moving toward an image boundary. This may be accomplished as described in connection with one or more of FIGS. 1-2 and 7.

If the zoom region has entered the frame border buffer zone and the tracked object is moving toward an image boundary (e.g., frame boundary, field of view boundary, etc.), the electronic device 102 may compensate 912 for global motion. This may be accomplished as described in connection with one or more of FIGS. 1-2 and 7. For example, the electronic device 102 may apply Equation (4) (instead of Equation (1) and/or Equation (2), for instance).

If the zoom region has not entered the frame border buffer zone or the tracked object is not moving toward an image boundary, the electronic device 102 may determine 914 zoom region motion based on the global motion information and a distance between the tracked object and a zoom region anchor point. This may be accomplished as described in connection with one or more of FIGS. 1-2 and 7. For example, the electronic device 102 may apply Equation (1), Equation (2), and/or Equation (3).

The electronic device 102 may determine 916 whether a size ratio of a tracking region and a zoom region is less than a minimum zoom threshold. This may be accomplished as described in connection with one or more of FIGS. 1-2 and 8. If the size ratio is less than the minimum zoom threshold, the electronic device 102 may increase 918 the zoom (e.g., increase the zoom factor, increase magnification, scale up the image content in the zoom region, etc., for example). This may be accomplished as described in connection with one or more of FIGS. 1-2 and 8.

If the size ratio is not less than a minimum zoom threshold, the electronic device may determine 920 whether the size ratio of the tracking region and the zoom region is greater than a maximum zoom threshold. This may be accomplished as described in connection with one or more of FIGS. 1-2 and 8. If the size ratio is greater than the maximum zoom threshold, the electronic device may decrease 922 the zoom (e.g., decrease the zoom factor, decrease magnification, scale down the image content in the zoom region, etc., for example). The method 900 may repeat for one or more following frames.

It should be noted that one or more of the operations (e.g., steps) of the method 900 may be optional (e.g., not implemented) in some configurations. Additionally or alternatively, one or more of the operations (e.g., steps) of the method 900 may be rearranged in a different order. It should also be noted that the zoom region may be updated by compensating 912 for global motion, determining 914 zoom region motion, increasing 918 zoom, and/or decreasing 922 zoom. In other cases, the updated zoom region may be the same (e.g., may be located in the same place and/or have the same zoom) as a previous frame zoom region. For example, the updated zoom region may be the same when no changes are made to the zoom region, when the zoom region motion is 0, and/or when the determinations 910, 916, 920 are negative, etc.

Figure 10:
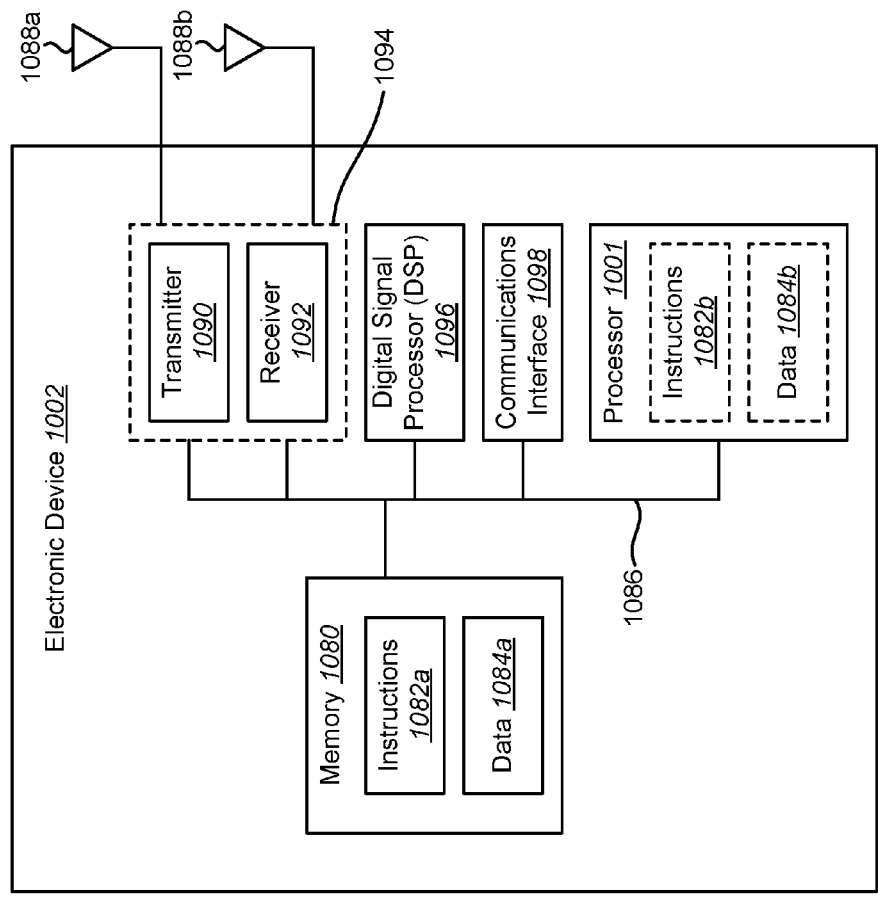
FIG. 10 illustrates certain components that may be included within an electronic device configured to implement various configurations of the systems and methods disclosed herein.

FIG. 10 illustrates certain components that may be included within an electronic device 1002 configured to implement various configurations of the systems and methods disclosed herein. Examples of the electronic device 1002 may include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, etc. The electronic device 1002 may be implemented in accordance with the electronic device 102 described in connection with FIG. 1.

The electronic device 1002 includes a processor 1001. The processor 1001 may be a general purpose single- or multi-chip microprocessor (e.g., an ARM), a special purpose microprocessor (e.g., a digital signal processor (DSP)), a microcontroller, a programmable gate array, etc. The processor 1001 may be referred to as a central processing unit (CPU). Although just a single processor 1001 is shown in the electronic device 1002, in an alternative configuration, a combination of processors (e.g., an ARM and DSP) could be implemented.

The electronic device 1002 also includes memory 1080. The memory 1080 may be any electronic component capable of storing electronic information. The memory 1080 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1084a and instructions 1082a may be stored in the memory 1080. The instructions 1082a may be executable by the processor 1001 to implement one or more of the methods, procedures, steps, and/or functions described herein. Executing the instructions 1082a may involve the use of the data 1084a that is stored in the memory 1080. When the processor 1001 executes the instructions 1082, various portions of the instructions 1082b may be loaded onto the processor 1001 and/or various pieces of data 1084b may be loaded onto the processor 1001.

The electronic device 1002 may also include a transmitter 1090 and a receiver 1092 to allow transmission and reception of signals to and from the electronic device 1002. The transmitter 1090 and receiver 1092 may be collectively referred to as a transceiver 1094. One or more antennas 1088a-b may be electrically coupled to the transceiver 1094. The electronic device 1002 may also include (not shown) multiple transmitters, multiple receivers, multiple transceivers and/or additional antennas.

The electronic device 1002 may include a digital signal processor (DSP) 1096. The electronic device 1002 may also include a communications interface 1098. The communications interface 1098 may allow and/or enable one or more kinds of input and/or output. For example, the communications interface 1098 may include one or more ports and/or communication devices for linking other devices to the electronic device 1002. In some configurations, the communications interface 1098 may include the transmitter 1090, the receiver 1092, or both (e.g., the transceiver 1094). Additionally or alternatively, the communications interface 1098 may include one or more other interfaces (e.g., touchscreen, keypad, keyboard, microphone, camera, etc.). For example, the communication interface 1098 may enable a user to interact with the electronic device 1002.

The various components of the electronic device 1002 may be coupled together by one or more buses, which may include a power bus, a control signal bus, a status signal bus, a data bus, etc. For the sake of clarity, the various buses are illustrated in FIG. 10 as a bus system 1086.

The term "determining" encompasses a wide variety of actions and, therefore, "determining" can include calculating, computing, processing, deriving, investigating, looking up (e.g., looking up in a table, a database or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. An electronic device, comprising:
a processor configured to:
obtain a plurality of images;
determine global motion between at least two of the plurality of images;
determine motion of a tracked object between the at least two of the plurality of images based on a full field of view of a camera input;
determine a digital zoom region that includes the tracked object based on the global motion and the motion of the tracked object, wherein the digital zoom region is a sub-region of the full field of view of the camera input; and
provide the digital zoom region to a display for presentation.

2. The electronic device of claim 1, wherein the processor is configured to determine a translation speed for the digital zoom region based on a location of the tracked object within the digital zoom region.

3. The electronic device of claim 1, wherein the processor is configured to determine motion of the digital zoom region based on the global motion information and a distance between a tracked object and an anchor point of the digital zoom region.

4. The electronic device of claim 1, wherein the processor is configured to compensate for global motion in a case that the digital zoom region enters a border buffer zone and a tracked object is moving toward an image boundary.

5. The electronic device of claim 1, wherein the processor is configured to determine a translation speed for the digital zoom region based on at least two zones in the digital zoom region.

6. The electronic device of claim 1, wherein the processor is configured to increase zoom in a case that a size ratio of a tracking region and the digital zoom region is less than a minimum zoom threshold.

7. The electronic device of claim 6, wherein the processor is configured to decrease zoom in a case that the size ratio is greater than a maximum zoom threshold.

8. The electronic device of claim 7, wherein there is a range between the minimum zoom threshold and the maximum zoom threshold.

9. The electronic device of claim 1, wherein the processor is configured to determine the digital zoom region further based on a history table.

10. The electronic device of claim 1, wherein the processor is configured to adjust a zoom level from frame-to-frame based on object motion in the full field of view.

11. A method, comprising:
obtaining a plurality of images;
determining global motion between at least two of the plurality of images;
determining motion of a tracked object between the at least two of the plurality of images based on a full field of view of a camera input;
determining a digital zoom region that includes the tracked object based on the global motion and the motion of the tracked object, wherein the digital zoom region is a sub-region of the full field of view of the camera input; and
providing the digital zoom region to a display for presentation.

12. The method of claim 11, further comprising determining a translation speed for the digital zoom region based on a location of the tracked object within the digital zoom region.

13. The method of claim 11, further comprising determining motion of the digital zoom region based on the global motion information and a distance between a tracked object and an anchor point of the digital zoom region.

14. The method of claim 11, further comprising compensating for global motion in a case that the digital zoom region enters a border buffer zone and a tracked object is moving toward an image boundary.

15. The method of claim 11, wherein determining a translation speed for the digital zoom region is based on at least two zones in the digital zoom region.

16. The method of claim 11, further comprising increasing zoom in a case that a size ratio of a tracking region and the digital zoom region is less than a minimum zoom threshold.

17. The method of claim 16, further comprising decreasing zoom in a case that the size ratio is greater than a maximum zoom threshold.

18. The method of claim 17, wherein there is a range between the minimum zoom threshold and the maximum zoom threshold.

19. The method of claim 11, wherein determining the digital zoom region is further based on a history table.

20. The method of claim 11, further comprising adjusting a zoom level from frame-to-frame based on object motion in the full field of view.

21. A computer-program product, comprising a non-transitory tangible computer-readable medium having instructions thereon, the instructions comprising:
   code for causing an electronic device to obtain a plurality of images;
   code for causing the electronic device to determine global motion between at least two of the plurality of images;
   code for causing the electronic device to determine motion of a tracked object between the at least two of the plurality of images based on a full field of view of a camera input;
   code for causing the electronic device to determine a digital zoom region that includes the tracked object based on the global motion and the motion of the tracked object, wherein the digital zoom region is a sub-region of the full field of view of the camera input; and
   code for causing the electronic device to provide the digital zoom region to a display for presentation.

22. The computer-program product of claim 21, further comprising code for causing the electronic device to determine a translation speed for the digital zoom based on a location of the tracked object within the digital zoom region.

23. The computer-program product of claim 21, further comprising code for causing the electronic device to determine motion of the digital zoom region based on the global motion information and a distance between a tracked object and an anchor point of the digital zoom region.

24. The computer-program product of claim 21, wherein the code for causing the electronic device to determine a translation speed for the digital zoom region is based on at least two zones in the digital zoom region.

25. The computer-program product of claim 21, further comprising code for causing the electronic device to increase zoom in a case that a size ratio of a tracking region and the digital zoom region is less than a minimum zoom threshold.

26. An apparatus, comprising:
   means for obtaining a plurality of images;
   means for determining global motion between at least two of the plurality of images;
   means for determining motion of a tracked object between the at least two of the plurality of images based on a full field of view of a camera input;
   means for determining a digital zoom region that includes the tracked object based on the global motion and the motion of the tracked object, wherein the digital zoom region is a sub-region of the full field of view of the camera input; and
   means for providing the digital zoom region to a display for presentation.

27. The apparatus of claim 26, further comprising means for determining a translation speed for the digital zoom region based on a location of the tracked object within the digital zoom region.

28. The apparatus of claim 26, further comprising means for determining motion of the digital zoom region based on the global motion information and a distance between a tracked object and an anchor point of the digital zoom region.

29. The apparatus of claim 26, further comprising means for determining a translation speed for the digital zoom region based on at least two zones in the zoom region.

30. The apparatus of claim 26, further comprising means for increasing zoom in a case that a size ratio of a tracking region and the digital zoom region is less than a minimum zoom threshold.

* * * * *